(12) United States Patent
Thielen et al.

(10) Patent No.: US 8,695,832 B2
(45) Date of Patent: Apr. 15, 2014

(54) CAN LID AND METHOD FOR PRODUCING A CAN LID

(76) Inventors: Klaus Thielen, Spinnerwinklweg (DE); Eva-Maria Thielen, Spinnerwinklweg (DE); Wolfgang Thielen, Oberschonauerstrasse (DE)

(*) Notice: Subject to any disclaimer, the term of this patent is extended or adjusted under 35 U.S.C. 154(b) by 0 days.

(21) Appl. No.: 13/576,569

(22) PCT Filed: Feb. 1, 2011

(86) PCT No.: PCT/EP2011/000446
§ 371 (c)(1),
(2), (4) Date: Nov. 19, 2012

(87) PCT Pub. No.: WO2011/095319
PCT Pub. Date: Aug. 11, 2011

(65) Prior Publication Data
US 2013/0020326 A1    Jan. 24, 2013

(30) Foreign Application Priority Data

Feb. 2, 2010 (EP) .................................. EP10001041
Mar. 31, 2010 (DE) ..................... DE10 2010 013 531

(51) Int. Cl.
*B65D 17/34* (2006.01)
*B21D 51/44* (2006.01)
*B65D 17/00* (2006.01)
*B21D 51/38* (2006.01)

(52) U.S. Cl.
CPC ............ *B65D 17/165* (2013.01); *B21D 51/383* (2013.01); *B65D 2517/0014* (2013.01)
USPC ............................................ 220/270; 413/19

(58) Field of Classification Search
CPC .. B65D 17/165; B65D 17/163; B65D 17/161; B65D 2517/0014; B65D 2517/0016; B21D 51/38; B21D 51/383
USPC .................. 220/270, 269, 268, 266, 265, 260; 413/19, 18, 16, 15, 14, 12, 8
See application file for complete search history.

(56) References Cited

U.S. PATENT DOCUMENTS 3,401,824 A * 9/1968 Rouse ............................ 220/273
3,432,068 A * 3/1969 Fraze et al. .................... 220/273

(Continued)

FOREIGN PATENT DOCUMENTS

DE    19 613 246    10/1997
EP    1 607 341 a1   12/2005

(Continued)

*Primary Examiner* — Robert J Hicks
(74) *Attorney, Agent, or Firm* — Vivacqua Law, PLLC; Raymond J. Vivacqua (57) ABSTRACT

A can lid (1) with a re-closable opening (11) includes an opening region or a closure cover (11), bounded by a peripheral tear-open notch (4), and a lever member intended for breaking through the tear-open notch. Adjacent to the tear-open notch (4), the outer rim of the closure cover (11) is non-positively connected to a collar part (5) of a first plastics material. The collar part is assigned a cover receiving part (10), of a second plastics material, which is outside the opening region and adjacent to the tear-open notch and is non-positively connected to the cover area, wherein the collar part engages over the cover receiving part. Formed between the collar part (5) and the cover receiving part (10) is a sealing snap-in locking connection with a peripheral domed rib and a complementarily formed recess.

32 Claims, 5 Drawing Sheets

(56) References Cited

U.S. PATENT DOCUMENTS

| | | | | |
|---|---|---|---|---|
| 3,434,623 | A | * | 3/1969 | Cookson ........................ 220/270 |
| 3,556,336 | A | * | 1/1971 | Coop ............................. 215/255 |
| 4,407,424 | A | * | 10/1983 | Heyn ............................ 220/269 |
| 4,582,216 | A | * | 4/1986 | Byrd ............................. 220/260 |
| 5,145,086 | A | * | 9/1992 | Krause .......................... 220/270 |
| 6,286,703 | B1 | | 9/2001 | Munro |
| 2009/0001081 | A1 | | 1/2009 | Schlattl et al. |
| 2011/0006065 | A1 | * | 1/2011 | Leboucher et al. ........... 220/270 |

FOREIGN PATENT DOCUMENTS

| | | |
|---|---|---|
| GB | 1 389 351 | 4/1975 |
| NL | 2000219 | 3/2008 |
| WO | WO 2008/098558 A1 | 8/2008 |

* cited by examiner

CAN LID AND METHOD FOR PRODUCING A CAN LID

The invention relates to a can lid having a reclosable opening, in particular for beverage cans, having an opening region bounded by a peripheral tear notch provided in the metallic can material, as well as having a two-armed lever member which is intended to pierce the tear notch, which is connected to a pull tab, on the one hand, and engages at the opening region of the lid surface, on the other hand, and which is supported via a bearing translating the opening force applied to the pull tab.

The invention is further directed to a method of producing a can lid as well as to cans which are equipped with such a can lid.

A can lid having a reclosable opening is known from EP 1 607 341 A1 in which an opening is introduced in the metallic can lid and the margin of this opening is beaded to create an anchorage possibility for a prefabricated plastic closure part. The plastic closure part includes a base part which is to be connected to the bead margin of the can opening and in which an opening closed by a flat stopper is formed. The flat stopper is connected to the opening margin via a plastic tear seam so that the flat stopper connected to a tear tab can be released from the base plastic part via the tear tab by exertion of a pull and can be pivoted into an open position. The opening can be temporarily closed again by pressing in the flat stopper which is preferably conical at its lower side.

A can lid having a reclosable opening is known from WO 2008/098558 A1 in which an opening into which a prefabricated tearable plastic closure part is inserted is likewise introduced in the metal can lid, with the prefabricated plastic element having a double flange at the marginal side into which the margin of the punched-out can opening engages and is fixed therein. The prefabricated plastic element includes a closure part which is connected to the peripheral margin of the plastic part via a tear seam. A tear tab connected to the closure part makes it possible to tear open the plastic tear seam between the peripheral region of the plastic part and the lid part and to release the can opening in this manner. For the purpose of reclosing, the closure part which preferably remains in connection with the peripheral region via a tab region is pressed back into the opening.

A reclosable can lid is known from GB 1 389 351 in which in particular the creation of sharp edges should be avoided such as occur on tearing open usual sheet metal cans via a tab. For this purpose, a punching provided in the metallic can lid is snapped into a prefabricated plastic part which has a lid part which is connected to the base part snapped into the can opening via a thin plastic wall. The thin connection wall between the closure part and the base part can be destroyed via a tear tab and the can opening can be exposed. The closure part is designed in this respect so that it engages into the base part via a snap-in latching connection to reclose the opening.

A beverage can is known from DE 89 11 286 U having a press-in lid closure in which the tear tab is rotatably supported at the lid wall and a closure element is provided at said lid wall which is taken along on the rotation of the tear tab from the tear position into a closure position above the opened pouring opening and engages over the pouring opening in a covering manner or engages into it in a closing manner.

A beverage can is known from DE 90 05 150 U having a lid which is composed of sheet metal in which an attenuating line is formed and the lid part bounded by the attenuating line can be separated by means of a pull tab, with a closure part for the removal opening pivotable substantially in parallel to the lid surface being captively fastened to the lid.

A lid of metal for beverage cans is known from DE 196 13 246 which has a prepunched pouring opening in the lid surface which is tightly closed by means of a closure element and can be tightly closed again after the first opening. In this respect, the lid and the closure element can be connected to one another in a shape-matched manner by elements which engage into one another in the manner of a bayonet and which are formed directly out of the lid material or the closure element.

The known designs for reclosable can lids suffer from disadvantages with respect to the required simple handling capability, the gas-tightness material to the storage capability of the respective can content and the usability in conventional plants of a can filling line which have had the result that these can closures have not been used in large technical applications.

It is the object of the invention to provide a can lid, in particular intended for beverage cans, having a reclosable opening, which cannot only be processed in the available plants of a can filling line, i.e. can be applied to the can and connected thereto in an airtight and gas-tight manner, but which above all ensures a high-quality gas-tight and liquid-tight closure in the region of the reclosable opening which withstands the high internal pressures occurring in required pasteurization steps, which requires only small opening forces and reclosure forces and which in particular also allows a one-handed operation on opening and closing.

This object is satisfied in accordance with the invention starting from a can lid having the features listed in the preamble of claim 1 in that the opening region is designed as a closure lid and is connected to a collar part made from a first plastic material in a force-transmitting manner at its outer margin adjacent to the tear notch; in that a lid receiving part made from a second plastic material which is connected in a force transmitting manner outside the opening region and adjacent to the tear notch to the lid surface is associated with the collar part; in that the collar part engages over the lid receiving part and a sealing snap-in latching connection to a peripheral coupling rib and to a cut-out of complementary shape is formed between the collar part and the lid receiving part; and in that the pull tab is fastened to a fixing region of the collar part radially outside the lid receiving part and the two-armed lever for piercing the tear notch is formed by a peripheral part region of the collar part associated with the fixing region.

By moving away from previously known prefabricated closure units which had to be connected to the can lid via flange elements and the like and by the integration in accordance with the invention of the lid receiving part and the collar part into the lid having a peripheral tear notch, a very compact, liquid-tight and gas-tight reclosable unit is provided, on the one hand, which can be opened with a small force by utilizing a peripheral part region of the collar part as a lever element supported at the lid receiving part and the required demands on the leak-tightness can also be satisfied without problem in the case of the reclosing of the can opening due to the provided shaped-matched snap-in latching connection.

To ensure the non-losability of the collar part ensuring the reclosure, a pivot tab connection is preferably provided opposite the fixing region between the collar part and at least one anchorage element provided at the lid surface, with the anchorage part, the pivot tab connection and the collar part comprising the same plastic material.

Provision is made in accordance with an embodiment of the invention that the pull tab comprising a third plastic material lies on the collar part in the state of rest and extends from the fixing region approximately up to the oppositely disposed inner margin of the collar part, with the elasticity of the material of the pull tab being larger than the elasticity of the material of the lid receiving part which is in turn in particular more elastic than the material of the collar part when the cut-out associated with the snap-in latching connection is provided at the lid receiving part. This embodiment promotes the simple handling capability with a simultaneous minimization of the space requirements for the pull tab.

Since can lids are as a rule coated on both sides over the full area with a synthetic resin lacquer which does not enter into any connection, or only enters into an insufficient connection with plastic materials, an embodiment of the invention is characterized in that respective holes or apertures distributed over the periphery are provided in the lid material for the force-transmitting connection of the collar part to the metallic opening region and of the lid receiving part to the lid surface and these holes or apertures are overmolded in a manner engaging over the margin with the respective plastic material in a gas-tight manner at both sides of the lid material. It is of particular advantage in this respect if the end faces and the adjacent marginal regions of the holes or apertures have previously been overmolded with a fourth plastic material in the form of an elastic sealing material and this sealing material is set under preload by the plastic material of the collar part or of the lid receiving part surrounding it and bonding to it.

In this manner, a flawless, gas-tight sealing is also ensured with respect to the lacquer layers, with the preload being achieved by the injection pressure and the post-pressure resulting on the injection.

In accordance with an alternative embodiment variant of the invention, provision is made that groove-like and partial groove-like recesses, in particular having undercuts and/or welded metallic retaining elements, are provided in the opening region and in the lid surface for the force-transmitting connection of the collar part to the metallic opening region and of the lid receiving part and the anchorage part to the lid area and that the collar part, lid receiving part and/or anchorage part are fixed in the recesses in a shape-matched and force transmitting manner by an injection molding process.

In this embodiment variant, it is superfluous to provide the can lid with holes, i.e. the required gas-tightness is ensured from the start.

Expediently, a kink-spring element known per se is integrated into the pivot tab connection, preferably comprising at least one film hinge, between the collar part and the anchorage part, said kink spring element holding the lid part in the pivoted open position on the pivoting of the collar part representing the lid part over a pivot open angle of advantageously more than 90°. A backward pivoting of the lid part is possible without problem in connection with such a kink spring element.

To ensure the demand for a stacking capability of a can equipped with the can lid in accordance with the invention as in the case of conventional cans, the height of the structure of lid receiving part, collar part and pull tab disposed above the metallic lid surface is designed so that it is smaller than the spacing between the lid surface and the bead margin. In this respect, it is also possible to keep free the can lid peripheral margin for supporting the further can respectively placed on a can lid and simultaneously to ensure that the plastic components are spatially so compact that they find room in the inward arching usually formed in a can base.

It is further of special advantage for the practical handling that the pull tab can be very easily gripped or gripped under for actuation since there is always a defined spacing, in particular predefined by the collar part height, between the pull tab and the opening region in the can wall. This spacing makes it possible to grip beneath the pull tab without problem with one finger, to lift the pull tab easily and then to apply the required pulling force for the purpose of the complete can opening. Any danger of an injury or, for example, damage to a finger nail on the opening procedure is thus precluded and a one-handed or blind operation is possible without problem.

A further particularly advantageous embodiment of the invention is characterized in that the lower side of the metallic cover is coated in a bonded manner covering at least the opening region, and in particular over the full area, with the preferably first plastic material, with this coating being attenuated or made thinner in the region of the tear groove.

It is of particular advantage in this respect that the lower side of the respective lid is preferably coated over the full area with a plastic material, in particular with the first plastic material, with this coating also being able to be of different thickness in different regions, but the thickness of this coating in any case being so reduced in the region of the tear seam that the tearing open of the lid can still take place without problem despite this coating. It is achieved by this coating that the leak-tightness of the can is also ensured if leaks should occur in the region of the metallic tear seam, in particular at an elevated internal pressure.

It is furthermore of advantage to continue this coating of the can lid at the inner side up to the lid margin since then this plastic coating acts as a seal in the region of the bead connection to the can and no further sealing material is necessary.

Further advantageous features of a can lid in accordance with the invention are set forth in the dependent claims and will also be explained in the description.

The invention furthermore relates to a method of manufacturing a can lid having an outer bead margin and having a lid surface which is set back inwardly thereto and in which a reclosable opening is provided.

The method in accordance with the invention, which is characterized by particular simplicity and by the achievable quality of the reclosable opening unit, in particular comprises the fact that the lid is punched and a peripheral tear notch is introduced into the lid surface and a ring groove is formed in the lid surface adjacent at least to the outside of the tear notch; that subsequently a lid receiving part is molded having a first coupling element comprising a plastic material having a predefinable elasticity with a simultaneous anchorage in the ring groove; that the can lid having the lid receiving part is then used as a counter mold and an annular collar part comprising a plastic material not bonding to the material of the lid receiving part is molded and is connected to the lid surface in a force transmitting manner adjacent to the inner side of the tear notch, with this annular collar part being designed so that it engages over the lid receiving part and has a second coupling element shaped in a complementary manner to the first coupling element and both coupling elements form a snap-in latching connection; and that a pull tab comprising elastic material is in particular molded simultaneously with the collar part, is anchored at one end in a radially outwardly disposed part region of the collar part and extends in the form of a ring tab to the center region of the can lid.

The individual injection molding processes required for producing the can lid can be realized without problem in conventional technology, with it obviously being of advantage that the lid surface having the already molded lid receiving part can be used as a negative mold for the next injection process for forming the collar part and the anchorage part as part of the production so that the ideal cooperation and the required shape matching can be achieved to perfection in conjunction with the reclosability.

Further special features of the method in accordance with the invention are set forth in the dependent claims.

Figure 1:
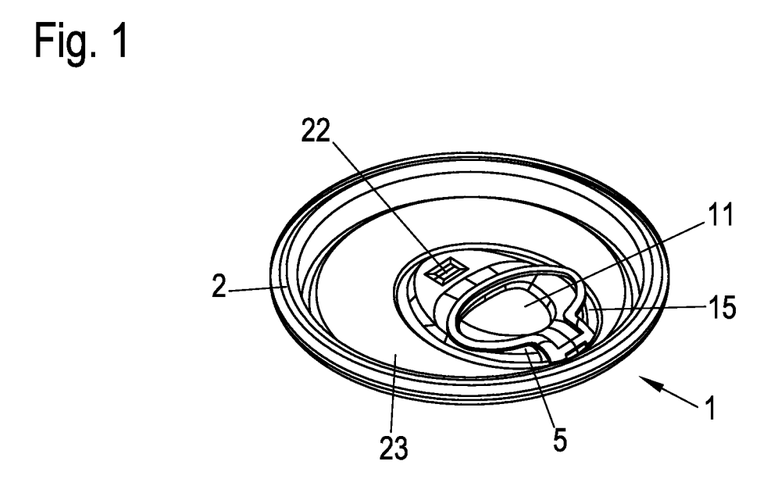
FIG. 1 a perspective oblique view of an embodiment of a reclosable can lid in accordance with the invention.

Finally, the invention is also directed to a complete can for packaging flowable or pourable products which is characterized in that it is closed by a can lid having the features of one or more of the claims relating to the can lid. The invention will be explained in more detail in the following with reference to embodiments and to the drawing; there are shown in the drawing:

FIG. 1 shows a can lid 1 which is designed conventionally in its base shape, which is made from metal, which carries a lacquer layer on both sides in a usual manner and which is connected in a liquid-tight and gas-tight manner to the respective associated can via a bead margin 2, preferably with the interposition of a sealing material.

A reclosable opening is integrated in this lid, offset off-center, as will still be explained in detail.

A collar part 5 can be recognized in FIG. 1 which is connected to a tear tab 15, is fixedly connected to the opening region 11 of the can lid and surrounds it in approximately ring form. The opening region 11 which is connected to the collar part 5 and which can be pivoted upward by means of the tab 15 in the opening process is anchored in the can lid for ensuring the non-losability of the part which can be pivoted upward, with a kink spring element 22 ensuring that the lid is held in the open position when it is in particular pivoted open by more than an angle of 90°.

Figure 2:
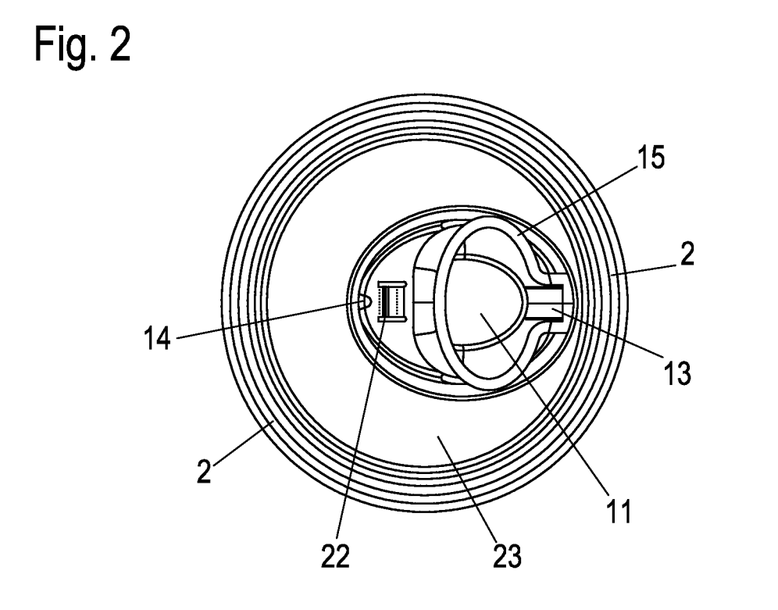
FIG. 2 a front view of the can lid of FIG. 1.

The plan view in accordance with FIG. 2 in turn shows the components already addressed in connection with FIG. 1, with an anchorage element 14 additionally being indicated in FIG. 2.

FIG. 2 illustrates that the reclosable opening with all its associated components is arranged off-center, and indeed such that the stackability as with conventional cans is maintained unchanged despite the presence of the reclosable opening.

The requirement for this is above all, in addition to the positioning, the compact design of the reclosable opening in accordance with the invention. The overhang of the components of the reclosable opening over the can surface amounts to only approximately 2 mm in accordance with the invention.

Figure 3:
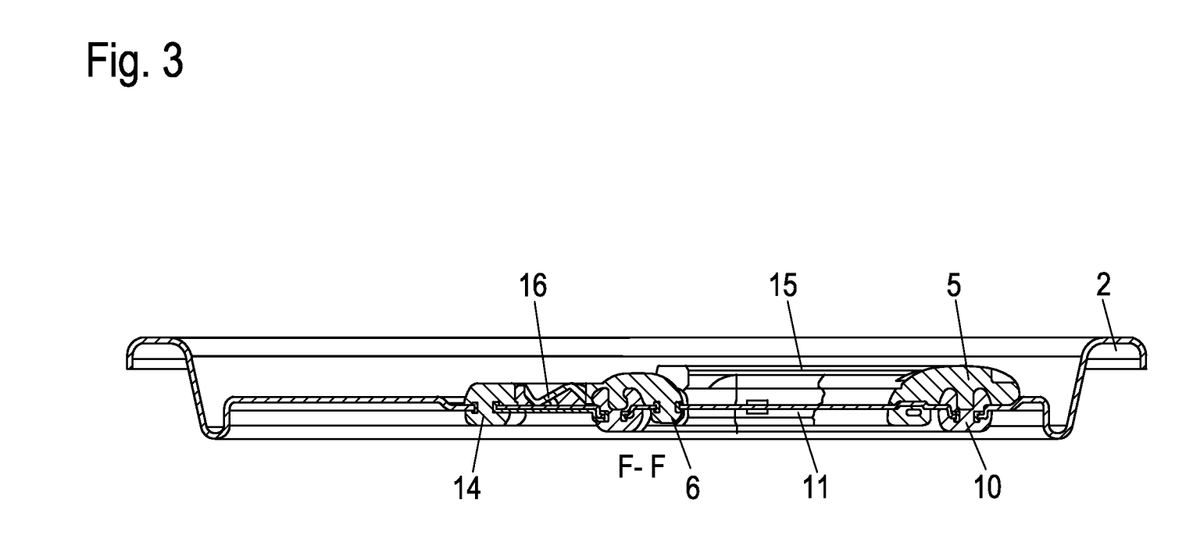
FIG. 3 a sectional view in accordance with the line C-C of FIG. 2.

FIG. 3 shows the basic structure of the reclosable opening in accordance with the invention integrated into the can lid in a sectional representation in accordance with the line C-C in FIG. 2.

One of the essential demands made on a reclosable lid is that the can closed by a can lid in particular also has to be liquid-tight and gas-tight in the region of the reclosable opening. It must be taken into account in this respect that, in the can manufacture, the filled cans are heated to approximately 80° C. for approximately 20 minutes and in this respect an internal pressure arises in the range of approximately 6 bar and this internal pressure may not have the result that a gas leak occurs immediately or when the cans are shipped.

After an opening of the can via the reclosable closure has once taken place, it must also be ensured by this closure that gas-tightness is ensured since internal pressures in the range of approximately 2 bar can easily occur due to shaking or jolting effects, with unwanted degassing effects being able to be adopted if the reclosable closure did not ensure the required leak-tightness.

It can be recognized from FIG. 3 that the reclosable connection in accordance with the invention is not a prefabricated unit which is inserted into a corresponding opening of the can lid, but rather a structure in which closure components are integrated in the metallic can lid and the tear region is defined by a conventional tear notch in the metallic can lid. The major components of the closure in accordance with the invention are formed by a peripheral lid receiving part 10 and a collar part 5 which cooperates therewith in the manner of a snap-in latching closure and which forms together with the opening region disposed within a tear notch the open-pivotable lid part which is connected to an anchorage element 14 via a pivot tab connection 16. The pull tab 15 engages at the collar part at the outer side and opposite the anchorage part 14.

Figure 4:
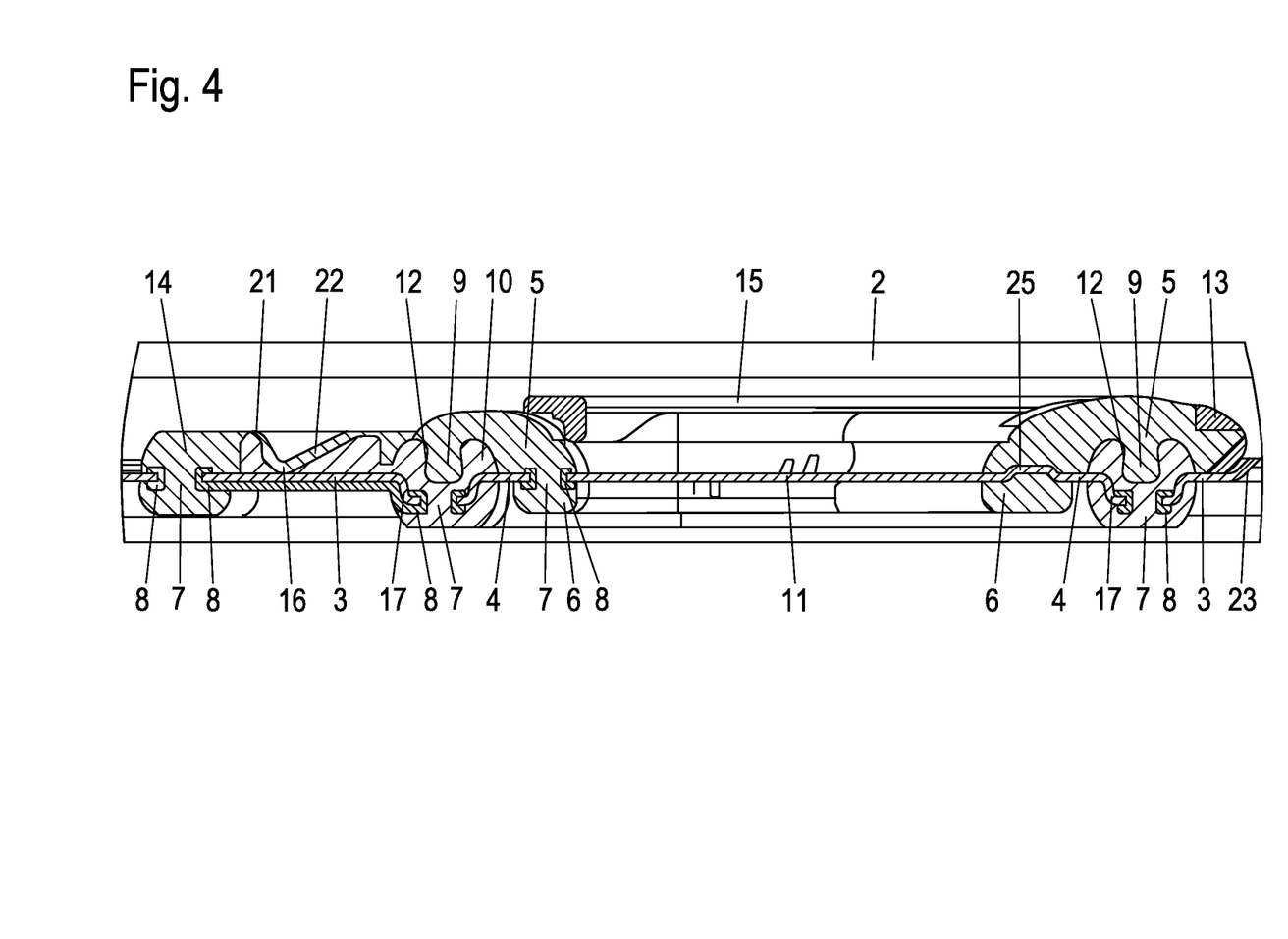
FIG. 4 a considerably magnified sectional view corresponding to the part region of FIG. 3 characterized by a circular shape.

FIG. 4 shows the specific design of a preferred embodiment of a can lid in accordance with the invention having a reclosable opening.

An opening region 11 is defined by a peripheral tear notch 4 of a known kind in the lid surface 3 slightly set back with respect to the visible surface 23 at the marginal side. A peripheral ring groove 17 is introduced into the lid surface 3 adjacent to the tear notch 4 and outside the opening region 11. The ring groove 17 increases the stiffness in a desired manner, but it also has an advantageous effect when an elevated pressure occurs in the can, in particular the pressure of approximately 6 bar in the pasteurizing step, since this ring groove produces a specific length or areal compensation when the can swells up a little. The tear notch disposed adjacently is also protected by this length or areal compensation.

A perforation which can comprise mutually spaced apart round, oval or elongate holes is provided in the base of the ring groove 17. Instead of such perforations or mixed with such perforations, so-called apertures can also be provided. i.e. openings with short, downwardly extending wall protuberances.

The perforations or apertures make it possible that, on the injection of the lid receiving part 10, the region of the ring groove 17 is surrounded at all sides by the plastic material used for the lid receiving part 10. Since it cannot easily be ensured by the coating of the lid material with a lacquer that a flawless gas-tight connection is achieved between the lid cover material and the plastic material, a special feature of the invention is that the free end faces and the surrounding regions of the holes 7 or apertures are overmolded with an elastic sealing material before the injection of the lid receiving part. On the subsequent injection of the lid receiving part 10, a connection is achieved, on the one hand, between the elastic sealing material 8 and the plastic material of the lid receiving part 10; however, it is of decisive importance in this respect that the sealing material 8 is subjected to preloading by the plastic material of the lid receiving part 10 so that the inner can space is also closed in an absolutely gas-tight manner with respect to the atmosphere when the plastic materials do not connect to the lacquer used for the can lid coating since a seal working with a permanent preload is realized here.

On the injection of the lid receiving part 10, a ring-shaped cut-out 12 is created which has approximately the shape of a downwardly expanding U and is suitable to form a snap-in latching mount with a corresponding counter-element.

A collar part 5 is associated with the lid receiving part 10 provided peripherally adjacent to the tear notch 4; it is composed of a plastic material differing from the lid receiving part 10 and is selected so that it does not connect to the material of the lid receiving part 10 in the injection molding process.

The collar part 5 is connected to the opening part 11 of the can lid in a firm and gas-tight manner, for which purpose holes 7 or apertures are provided approximately analog to the holes or apertures at the base of the ring groove 17 in the region of the outer periphery of the opening region 11 adjacent to the tear notch 4. These holes 7 or apertures—which cannot be seen in the right hand part of the representation of the collar part 5 due to the extent of the section—are in turn overmolded with an elastic sealing material 8 in the region of their end faces so that, on the molding of the collar part, the corresponding plastic material can move through the holes 7 or apertures and can form a fastening protuberance beneath the opening region 11. The plastic material of the collar part 5 and the elastic sealing material 8 also cooperate in the same manner here as was already described in connection with the lid receiving part 10, i.e. a mechanically firm, gas-tight connection is also provided here between the material of the opening region 11 and the collar part 5.

On the demolding of the collar part extending over the lid receiving part 10, a rib 9 is formed which has a complementary shape to the cut-out 12 in the lid receiving part 10 so that the already mentioned snap-in latching connection can be provided.

Simultaneously with the demolding of the collar part 5, in which the can lid surface and the lid receiving part already integrated therein serve as a counter-part, a pivot tab connection 16 is also provided with an anchorage element 14 likewise simultaneously formed in the lid surface 3. The anchorage element 14 is formed in the same manner and has the same design as the connection between the collar part 5 and the opening region 11, i.e. gas-tightness is likewise ensured by the elastic sealing material provided between the can lid hole 7 and the plastic material of the anchorage element. Between the film hinges 21, which are provided adjacent to the anchorage element 14, a kink spring element 22 of conventional design is integrated in the pivot tab connection 16 and comprises the same material. This kink spring element 22 holds the lid in the open position when it is pivoted open by more than 90°. On the closing of the lid, the kink spring element 22 snaps over and does not impede the closing procedure in any way.

The collar part 5 is connected at a fixing region 13 to the flexibly formed pull tab 15 at the region of the collar part which is closest to the bead margin 2 and which is opposite the anchorage part 14, with the connection preferably taking place as part of an injection process. The pull tab 15 extends up to the oppositely disposed inner region of the collar part 5, contacts it and extends in parallel to the plane of the opening region 11, i.e. in the closed state of the reclosable opening, a very space-saving compact arrangement is present whose height is much smaller than the spacing between the lid surface 3 and the bead margin 2.

It has already been mentioned that different plastic materials are to be used for different components. In the embodiment in accordance with FIG. 4, a plastic material is used for the lid receiving part which ensures an easy widening of the cut-out 12 on the pressing in of the coupling rib 9 and a subsequent holding of this coupling rib 9 via a rounded undercut and, on the other hand, ensures the exertion of a required preload onto the plastic material used for the elastic sealing material 8 after the injection process. The plastic material for the elastic sealing material 8 is substantially more elastic than the plastic material of the lid receiving part. A plastic material is used for the collar part 5 which, on the one hand, does not enter into any connection with the material of the lid receiving part 10 and, on the other hand, is also much less elastic than the material of the lid receiving part 10. This is also important because the collar part 5 has to have a basic stiffness which is required for the can opening procedure.

The plastic material used for the pull tab in turn preferably differs from the three already addressed plastic materials and is so elastic that the pull tab can be raised without problem by being engaged beneath and can then be actuated in the manner required for opening.

It is necessary for the first-time opening of a can that the peripheral tear notch 4 is pierced and then the lid part formed by the opening region 11 and the collar part 5 can be pivoted upward at one side.

Since a relatively small opening force is required with respect to the opening process, an opening force translation is provided in the subject of the application which is implemented in that the pull tab 15 is pivotally connected to the radially outer fixing region 13 of the collar part and a support of the collar part at the radially inner limb of the cut-out 12 of the lid receiving part 10 takes place on the pulling up of the radially outer end of the collar part 5 by means of the pull tab and the relatively long lever between this limb and the fixing region 13 thus cooperates with the much shorter lever which is formed at the opening region 11 and is active between this radially inner limb of the lid receiving part acting as a support limb and the fastening point of the collar part 5. The shorter lever is in this respect moved inwardly, i.e. toward the can inner space and the deformation which occurs has the effect—assisted by the local projection 25 provided for increasing stiffness—of a local piercing of the tear notch 4 which is then opened over the total periphery with a small force on the further pulling up of the pull tab 15. In this respect, the coupling rib 9 leaves the corresponding cut-out 12 in the lid receiving part. The lid can then be removed from the formed free opening and pivoted upwardly after a complete separation of the snap-in latching connection via the pivotable connection 16 and the film hinges 21. The opened lid is held in the open position by the present kink spring element 22.

To reclose the opening, the lid part guided exactly by a two-armed pivot tab connection 16 is again brought into contact with the lid receiving part 10, with the peripheral rib 9 snapping into the corresponding cut-out 12 with shape matching being able to be moved into the closed position shown in FIG. 4 by a light exertion of pressure.

The first-time opening of a can differs from following opening and closing procedures as a rule in that the force required for the first-time opening is larger by a multiple than the force required for the repeat opening after reclosing and that above all also the respective perceivable noise formation is very different.

If desired, at least one visible element can be provided between the lid receiving part 10 and the collar part 5 whose structure and/or whose appearance and/or whose position is necessarily changed by the first-time opening procedure of the collar part 5.

In the following, further different alternatives of the connection of the collar part and/or lid receiving part to the metallic can lid surface will be explained.

Figure 5:
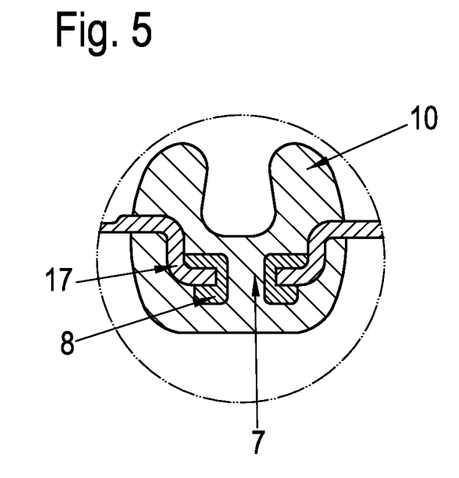
FIGS. 5 to 9 respective magnified detail views of connections in accordance with the invention made as liquid-tight and gas-tight between the metallic can lid, which is in particular provided with lacquer layers at both sides, and plastic elements molded in situ such as the lid receiving part, the collar part and/or the anchorage element.

FIG. 5 shows the already explained variant in which a sealing material is provided in the region of the hole 7 between the metallic sheet metal 17 provided with a cover lacquer and the plastic material of the lid receiving part 10 or the collar part 5.

Figure 6:
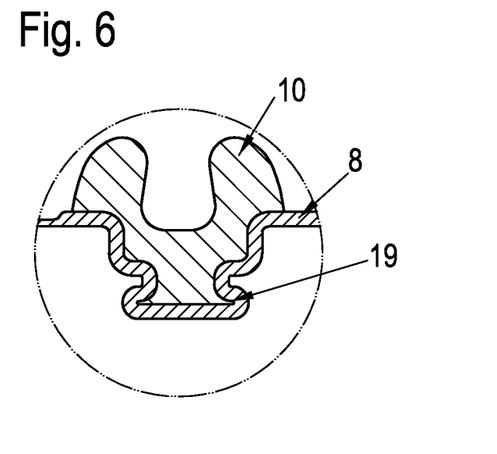

FIG. 6 shows an embodiment variant in which holes or apertures are avoided in the can lid material. For this purpose, recesses 18 are formed in the material of the can lid which are provided with at least one undercut 19. If the plastic material for the lid receiving part or for the collar art is molded into such a cut-out, force-transmitting and shape-matching connections result which ensure the required secure hold of the plastic material.

Figure 7:
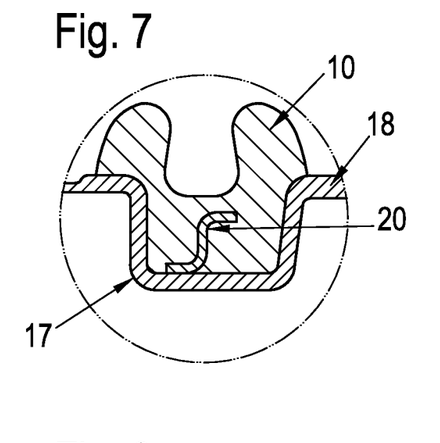

FIG. 7 shows a further embodiment in which, instead of the undercut provided in FIG. 6, specially shaped retaining elements 20 are fastened, e.g. welded, in the ring groove 17, which allow the avoidance of undercuts with the same effect.

Figure 8:
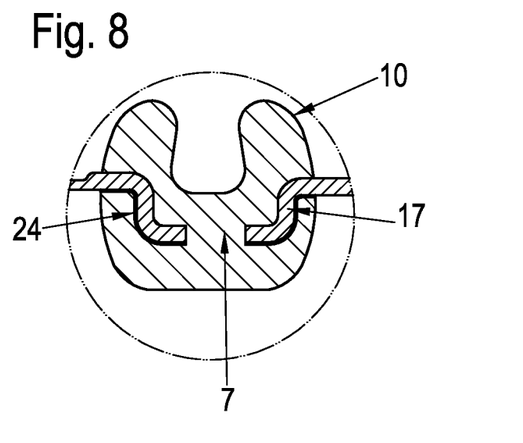

FIG. 8 shows an embodiment variant in which a bonding agent 24 is provided between the metallic sheet metal of the ring groove 17 and the plastic material used for the lid receiving part 10 or for the collar part 5, said bonding agent also ensuring a mechanically stable and above all gas-tight connection between the plastic and the metal when the metal sheet is provided with a lacquer layer. The layer of bonding agent 24 is in this respect provided at the metal sheet at the inner side of the can.

Figure 9:
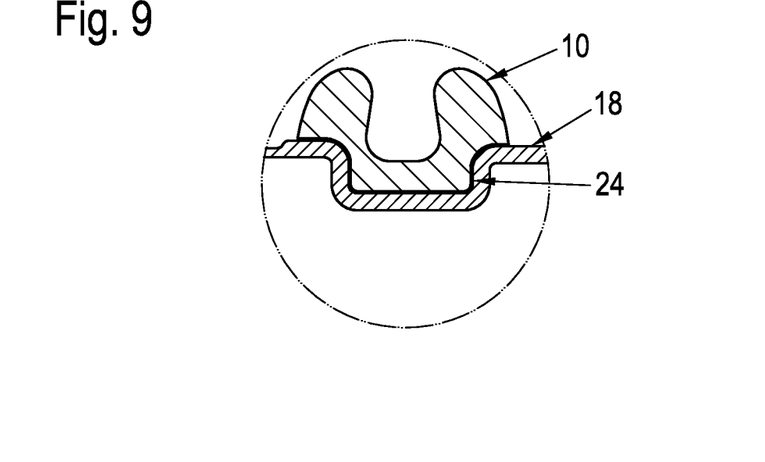

FIG. 9 shows an embodiment in which no holes are again required in the lid surface of the can lid, but the gas-tight fixing of the collar part 5 and/or lid receiving part 10 rather takes place in a recess which is provided with a bonding agent layer 24 which ensures a gas-tight connection between the plastic and the metal.

Figure 10:
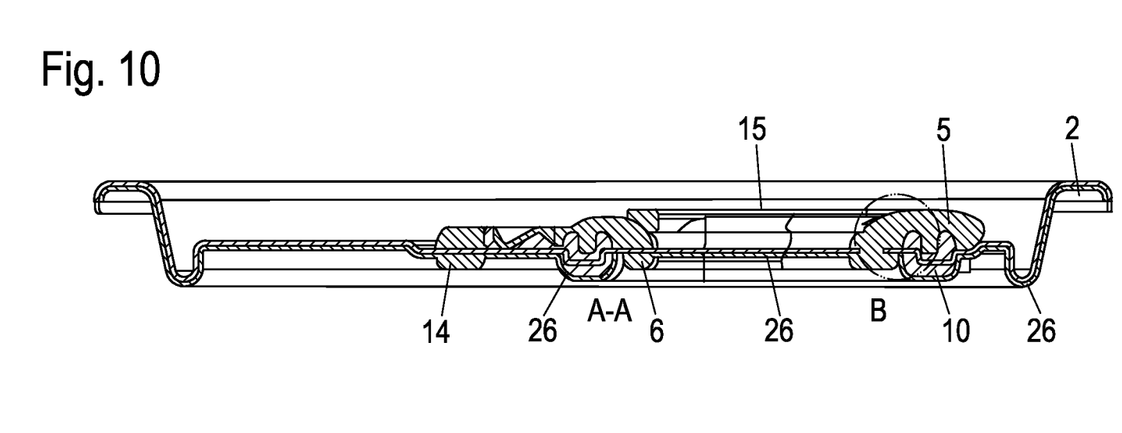
FIG. 10 a particularly advantageous embodiment of the invention.
Figure 11:
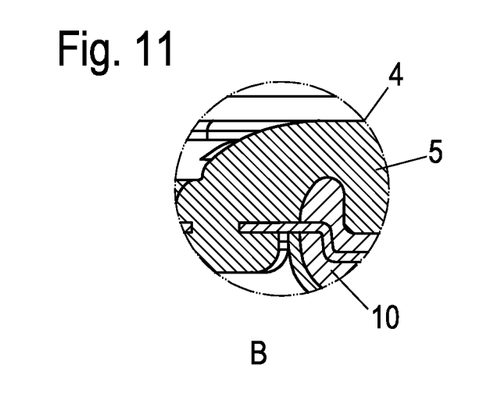
FIG. 11 a detailed view of FIG. 10 for explaining the attenuation of the lid coating at the bottom side in the region of the tear seam.

FIGS. 10 and 11 show a particularly advantageous aspect of the invention in which the lower side of the can lid is provided with a plastic coating 26 which is applied via a bonding agent and which preferably comprises the same material as the collar part. The total embodiment of the can lid in accordance with the invention is particularly advantageous when only two different plastic materials are used, as is shown in FIG. 10, which also allows it to be recognized that the pull tab 15 is molded from the same plastic material.

The lower-side plastic coating 26 is formed attenuated in the region of the tear groove. This can be seen in the detail representation of FIG. 11. The thickness of this plastic coating 26 can be reduced down to $1/10$ mm and less in the region of the tear seam.

It is particularly advantageous to lead the plastic coating 26 up to the margin of the lid since it can then simultaneously form the seal in the region of the bead connection and no further plastic material is required for sealing purposes.

This lower-side plastic coating 26 ensures an absolute leak-tightness of the can lid even if the tear seam should not be leak-tight, in particular at elevated pressure. In addition, this lower-side plastic coating also covers the fastening regions of the lid receiving part, which is of advantage for the leak-tightness and operational safety.

The method in accordance with the invention of manufacturing a can lid having a reclosable opening in particular includes the following method steps:

On the punching of the metallic lid, a ring groove is formed in the lid surface at the outer side adjacent to the provided peripheral tear notch in the lid surface. In accordance with a variant of the invention, such a ring groove can also be provided at the inside of the tear notch. After formation of the ring groove or ring grooves, the peripheral tear notch bounding the opening region is introduced into the lid surface. In the case of the provision of ring grooves disposed at both sides of the tear notch, they later serve for fixing the collar parts and lid receiving parts to be formed. A ring groove is preferably only provided outside the tear notch in which a lid receiving part is fixed in a manner still to be described.

In accordance with an advantageous variant, which is in particular shown in FIG. 4 and in which perforations without a ring groove are provided outside the tear notch and perforations are provided in a ring groove within the tear notch, perforations are introduced simultaneously or offset in time into the base of the ring groove and into the region inwardly adjacent to the tear notch for forming the outwardly disposed ring groove.

In a next method step, the perforations are overmolded with an elastic sealing material at the end face and in the environment of their end faces.

In a further method step, the lid receiving part is molded while using the corresponding molded parts with a surrounding of the already elastic sealing material at all sides, and indeed preferably simultaneously with a support region for a pivot tab disposed on the side of the anchorage element.

The structure thus obtained of metallic lid surface with an integrated lid receiving part is used as a counter-mold for the next following injection molding process so that the ring-shaped recess in the lid receiving part forms the counter-mold region for the coupling rib which engages with shape matching and which is an integral part of the ring-shaped collar part. On the injection of this ring-shaped collar part, the plastic material penetrates through the holes already provided with an elastic sealing material, with a durable preload being exerted onto the elastic sealing material by the injection pressure and the post-pressure resulting on injection. The plastic materials used for the collar part and for the lid receiving part in this respect enter into a connection with the elastic sealing material. Simultaneously with the injection of the collar part, the anchorage part and the pivot tab connection, in particular with the kink spring element, are also preferably molded.

Simultaneously with or offset in time with the injection of the collar part, the pull tab is also molded using an obliquely set mold, with the pull tab material being able to penetrate into correspondingly provided cut-outs of the collar part material in the fixing region between the pull tab and the anchorage part and with the pull tab being fixed in this manner.

The production process in which four different plastic materials can be used in the above-described case, can be modified in dependence on the connection possibilities shown in FIGS. 5 to 9 between the lid material and the collar part or the lid receiving part. In the case of the variants in accordance with FIGS. 6, 7 and 9, for example, the formation of perforations in the lid material can thus be omitted, and indeed in the same way as the application of sealing material associated with these perforations. In return, method steps are then required for applying a bonding agent or for applying retaining elements.

It is, however, common to all embodiments of the invention that the reclosable can lid can be processed in conventional production processes, i.e. in the procedure of processing can lids without a reclosable opening, and can accordingly be applied to the respect can using the available plants of a can filling line and the can can be closed. It is also ensured by the gas-tightness achieved in accordance with the invention that the durability of the respective can contents are not negatively impaired in any manner in comparison with non-reclosable cans.

It must finally also be mentioned that with the can lid in accordance with the invention, promoted by the free space beneath the pull tab, an opening of the can is possible without problem by a one-handed operation since the easily accessible pull tab can be gripped with one finger and can be pulled in the direction of the anchorage point while opening the can. The realized force translation in this respect has a particularly advantageous effect.

REFERENCE NUMERAL LIST 1 can lid
2 bead rim
3 lid surface (opening region)
4 tear notch
5 collar part (first plastic material)
6 fastening projection
7 hole, aperture
8 elastic sealing material (fourth plastic material)
9 coupling rib
10 lid receiving part (second plastic material)
11 opening region
12 cut-out
13 fixing region
14 anchorage element
15 pull tab (third plastic material)
16 pivot tab connection
17 ring groove
18 recesses
19 undercut
20 retaining element
21 film hinge
22 kink spring element
23 visible surface
24 bonding agent
25 projection
26 plastic coating

The invention claimed is:

1. A can lid having a reclosable opening,
having an opening region (11) bounded by a peripheral tear notch (4) provided in the can lid;
as well as having a two-armed lever member intended for piercing the tear notch (4);
which is connected to a pull tab (15), on the one hand, and engages at the opening region (11) of the lid surface (3), on the other hand, and is supported via a bearing translating the opening force applied to the pull tab (15);
wherein the opening region (11) is formed as a closure lid and is connected to a collar part (5) composed of a first plastic material in a force-transmitting manner at its outer margin adjacent to the tear notch (4);
wherein a lid receiving part (10) composed of a second plastic material is associated with the collar part (5) and which lid receiving part (10) is connected to the lid surface (3) in a force-transmitting manner outside the opening region (11) and adjacent to the tear notch (4);
wherein the collar part (5) engages over the lid receiving part (10) and a sealing snap-in latching connection having a peripheral coupling rib (9) and a cut-out (12) shaped in complementary form thereto is formed between the collar part (5) and the lid receiving part (10); and
wherein the pull tab (15) is fastened radially outside of the lid receiving part (10) to a fixing region (13) of the collar part (5) and the two-armed lever member is formed for piercing the tear notch (4) by a peripheral part region of the collar part (5) associated with the fixing region (13).

2. A can lid in accordance with claim 1,
wherein a pivot tab connection (16) is provided opposite the fixing region (13) between the collar part (5) and at least one anchorage element (14) provided at the lid surface (3), wherein the anchorage part (14), the pivot tab connection (16) and the collar part (5) comprise the same plastic material.

3. A can lid in accordance with claim 1,
wherein the pull tab (15) composed of a third plastic material lies on the collar part (5) in the state of rest and extends from the fixing region (13) approximately up to the oppositely disposed inner margin of the collar part (5),
wherein the elasticity of the material of the pull tab (15) is larger than the elasticity of the material of the lid receiving part (10) which is in turn more elastic than the material of the collar part (5).

4. A can lid in accordance with claim 1,
wherein holes (7) or apertures are provided in the lid material respectively distributed over the periphery for the force-transmitting connection of the collar part (5) to the metallic opening region (11) and of the lid receiving part (10) to the lid surface (3) and these holes (7) or apertures are overmolded by the respective plastic material in a manner engaging over the margin in a gas-tight manner at both sides of the lid material (3, 11).

5. A can lid in accordance with claim 4,
wherein
the end surfaces and the adjacent marginal regions of the holes (7) or apertures are overmolded by a fourth plastic material in the form of an elastic sealing material (8); and wherein this sealing material (8) is set under a preload by the plastic material of the collar part (5) or of the lid receiving part (10) surrounding said sealing material and bonding to it.

6. A can lid in accordance with claim 4,
wherein the holes (7) or apertures are provided for connecting the lid receiving part (10) and the lid surface (3) at the base of a substantially U-shaped ring groove (17) extending to the inner can space.

7. A can lid in accordance with claim 1,
wherein grooved recesses (18) are provided in the opening region (11) and in the lid surface (13) for the force-transmitting connection of the collar part (5) to the metallic opening region (11) and of the lid receiving part (10) and of the anchorage part (14) to the lid surface (3); and wherein the collar part (5), the lid receiving part (10) and/or the anchorage part (14) are fixed in a shape-matched and force-transmitting manner in the recesses (18) by an injection molding process.

8. A can lid in accordance with claim 7,
wherein the grooved recesses (18) are provided with undercuts (19) and/or welded metallic retaining elements (20).

9. A can lid in accordance with claim 2,
wherein the pivot tab connection (16) includes a two-limbed film hinge (21) and a kink spring element (22) which is formed between the limbs and which holds the pivoted open closure lid (5, 11) in an obtuse-angle open position.

10. A can lid in accordance with claim 1,
wherein the peripheral coupling rib (9) is provided at the collar part (5) and the cut-out (12) of complementary shape is provided in the lid receiving part (10).

11. A can lid in accordance with claim 1,
wherein the pull tab (15) is held by the collar part (5) spaced part with respect to the metallic opening region (11) and the pull tab (15) can be gripped by being engaged beneath and actuated by an opening finger due to its spacing.

12. A can lid in accordance with claim 11, wherein the pull tab (15) is designed in ring form.

13. A can lid in accordance with claim 1, wherein at least one visible element is provided between the lid receiving part (10) and the collar part (5) whose structure and/or whose appearance and/or whose position is necessarily changed by a first-time opening procedure of the collar part (5).

14. A can lid in accordance with claim 1, wherein the can lid further includes a bead margin (2) and the height of the structure comprising the lid receiving part (10), the collar part (5) and the pull tab (15) disposed above the metallic lid surface (3) is smaller than the spacing between the lid surface (3) and the bead margin (2).

15. A can lid in accordance with claim 1, wherein the lid surface (11, 3) associated with the mounting region of the components (5, 10, 14) composed of plastic material is made recessed with respect to the visible surface (23) surrounding it at all sides.

16. A can lid in accordance with claim 1, wherein the lower side of the metallic lid is coated in a bonded manner covering at least the opening region (11) and with this coating being attenuated or made thinner in the region of the tear groove.

17. A can lid in accordance with claim 16, wherein the lower side of the metallic lid is coated over the full area.

18. A can lid in accordance with claim 16, wherein the lower side of the metallic lid is coated with the first plastic material.

19. A can lid in accordance with claim 1, wherein a bonding agent is applied between the respective plastic material and the metallic lid surface.

20. A can lid in accordance with claim 16 further including a lower side plastic coating (26) extending up to the lid margin and serving as a seal in the bead region on a connection with the associated can.

21. A method of manufacturing a can lid having an outer bead margin and having a lid surface which is set back inwardly thereto and in which a reclosable opening is provided, in which the method the lid is punched and a peripheral tear notch is introduced into the lid surface and a ring groove is formed in the lid surface adjacent at least to the outside of the tear notch;

wherein a lid receiving part having a first coupling element comprising a plastic material having a predefinable elasticity is subsequently molded with a simultaneous anchorage in the ring groove;

wherein the can lid having the lid receiving part is then used as a counter mold and an annular collar part comprising a plastic material not bonding to the material of the lid receiving part is molded and is connected to the lid surface in a force-transmitting manner adjacent to the inner side of the tear notch, wherein this annular collar part is designed so that it engages over the lid receiving part and has a second coupling element shaped in a complementary manner to the first coupling element and both coupling elements form a snap-in latching connection; and wherein a pull tab comprising elastic material is molded which is anchored at one end in a radially outwardly disposed part region of the collar part and extends in the form of a ring tab to the center region of the can lid.

22. A method in accordance with claim 21, wherein the pull tab is molded simultaneously with the collar part.

23. A method in accordance with claim 21, wherein a coupling cut-out aligned substantially perpendicular to the lid surface and designed approximately in U shape in cross-section is formed as the first coupling element and a coupling rib of complementary shape is formed as the second coupling element.

24. A method in accordance with claim 21, wherein simultaneously with the formation of the peripheral groove in the lid surface, holes or apertures are punched, distributed over the periphery, in the base wall of the peripheral groove and in the region adjacent to the tear notch for fastening the collar part, said holes or apertures being interspersed by the respective associated plastic materials for the lid receiving part and the collar part so that the regions adjacent to the holes or apertures are embedded in the respective plastic material at both sides of the lid surface.

25. A method in accordance with claim 24, wherein an elastic sealing material is molded about the end faces of the holes or apertures as well as their adjacent marginal regions before the injection of the collar part and before the injection of the lid receiving part, wherein this sealing material is connected to these materials and being set under preload on the injection of the materials for the collar part and the lid receiving part.

26. A method in accordance with claim 21, wherein a peripheral groove is also formed adjacent to the tear notch at the inner side in the material of the opening region simultaneously with the formation of the peripheral groove disposed outside the tear notch in the lid surface and both peripheral grooves are provided with undercuts and/or retaining elements; and wherein the materials for the collar part and the lid receiving part are anchored in these grooves free of material holes in a shape-matching and force-transmitting manner.

27. A method in accordance with claim 21, wherein an anchorage part disposed diagonally opposite the fixing region for the pull tab and spaced apart from the lid receiving part is molded simultaneously with the lid receiving part which is connected to the lid receiving part via a pivot tab process and is composed of the same material.

28. A method in accordance with claim 27 further including an injection process that establishes the mechanical connection between the anchorage part and the lid surface and the connection between the lid receiving part and the lid surface.

29. A method in accordance with claim 28, wherein simultaneously a two-limbed film hinge having a kink spring element formed between the two limbs of this hinge is formed between the anchorage part and the lid receiving part at the same time the pivot tab is formed.

30. A can for packaging flowable or pourable products, wherein the can is closed by a can lid having a reclosable opening, having an opening region (11) bounded by a peripheral tear notch (4) provided in the can lid;

as well as having a two-armed lever member intended for piercing the tear notch (4);

which is connected to a pull tab (15), on the one hand, and engages at the opening region (11) of the lid surface (3), on the other hand, and is supported via a bearing translating the opening force applied to the pull tab (15);

wherein the opening region (11) is formed as a closure lid and is connected to a collar part (5) composed of a first plastic material in a force-transmitting manner at its outer margin adjacent to the tear notch (4);

wherein a lid receiving part (10) composed of a second plastic material is associated with the collar part (5) and which lid receiving part (10) is connected to the lid surface (3) in a force-transmitting manner outside the opening region (11) and adjacent to the tear notch (4);

wherein the collar part (5) engages over the lid receiving part (10) and a sealing snap-in latching connection having a peripheral coupling rib (9) and a cut-out (12) shaped in complementary form thereto is formed between the collar part (5) and the lid receiving part (10); and wherein the pull tab (15) is fastened radially outside of the lid receiving part (10) to a fixing region (13) of the collar part (5) and the two-armed lever member is formed for piercing the tear notch (4) by a peripheral part region of the collar part (5) associated with the fixing region (13).

31. A can in accordance with claim 30, wherein the can is for the packaging of beverages.

32. A can in accordance with claim 30 further including a can base, wherein the can base is inwardly arched in the manner of a dome and is formed for receiving the structure of the lid receiving part, the collar part and the pull tab disposed above the can lid; and in that the lid cover has a peripheral marginal region free of structures.

\* \* \* \* \*